Feb. 15, 1955   J. W. ALLISON   2,701,993
CONTROL FOR AGRICULTURAL IMPLEMENTS
Filed July 15, 1948   3 Sheets-Sheet 2
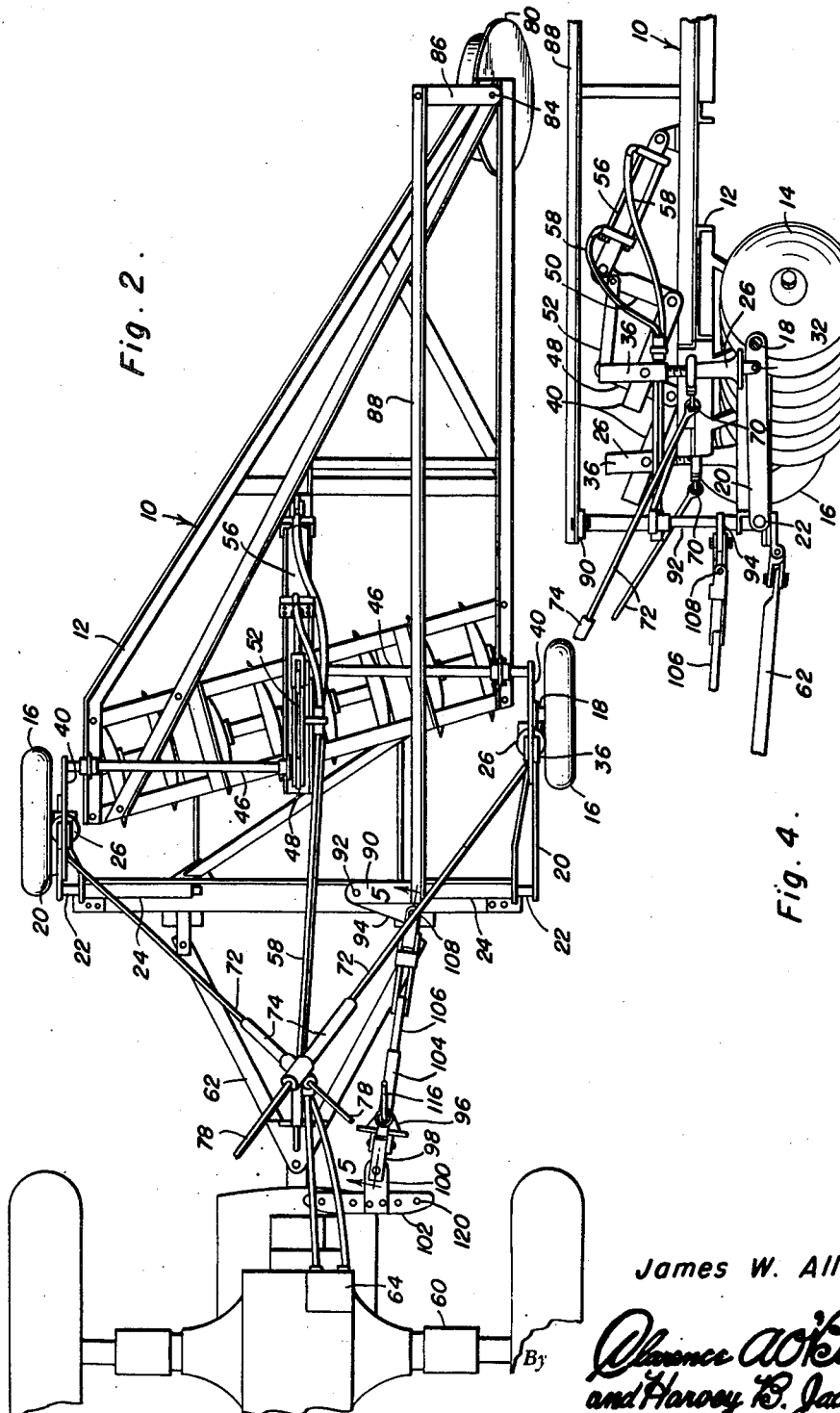
Inventor
James W. Allison

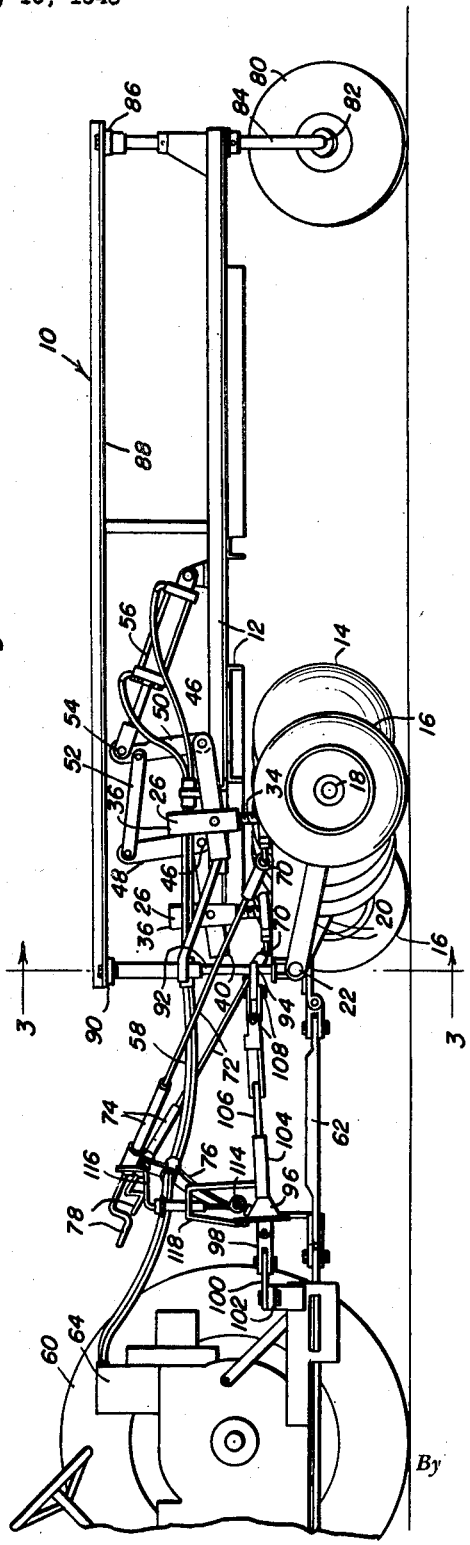

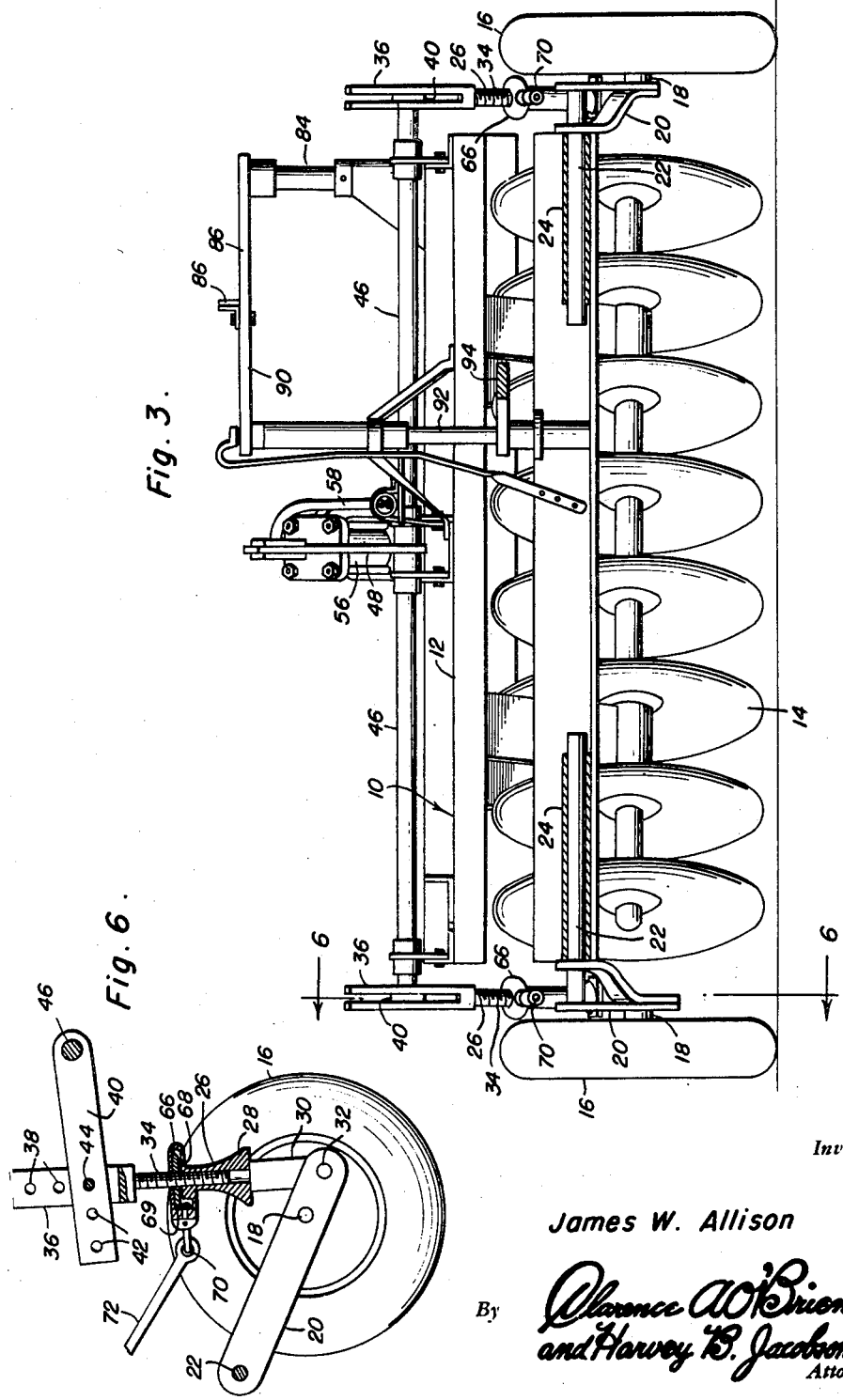

United States Patent Office 2,701,993
Patented Feb. 15, 1955

2,701,993

CONTROL FOR AGRICULTURAL IMPLEMENTS

James W. Allison, Inchelium, Wash.

Application July 15, 1948, Serial No. 38,880

3 Claims. (Cl. 97—46.27)

This invention relates to new and useful improvements and structural refinements in agricultural implements, more particularly, disk plows, harrows, and the like, and the principal object of the invention is to facilitate convenient raising, lowering and turning of traveling wheels with which such implements are usually provided, matters being so arranged that the controls may be conveniently manipulated from the driver's seat of the tractor by which the implement is drawn.

More particularly, the invention contemplates the provision of power actuated means for raising and lowering the front pair of wheels of a disk plow and turning in a horizontal plane the rear wheel of such a plow, the wheel turning operation being effected manually by remote control.

Moreover, the invention also contemplates the provision of longitudinally adjustable members in the wheel raising and lowering mechanism, whereby manual adjustment of these members (by remote control) may be effectively employed for pre-setting the "depth" of the plow disks with respect to the traveling wheels.

An important advantage of the invention resides in its simplicity of construction, ease and convenience of operation, and in its adaptability to agricultural implements of various sizes and types.

With the above more important objects and features in view and such other objects and features as may become apparent as this specification proceeds, the invention consists essentially of the construction and arrangement of parts as shown in the accompanying drawings in which:

Figure 1 is a side elevational view showing a disk plow drawn by a tractor and illustrating the invention in situ thereon;

Figure 2 is a top plan view of the subject shown in Figure 1;

Figure 3 is a cross sectional veiw, taken substantially in the plane of the line 3—3 in Figure 1;

Figure 4 is a fragmentary side elevational view, similar to that illustrated in Figure 1, but showing the wheels in their elevated position with the adjacent front wheel removed for purposes of illustration;

Figure 5 is a cross sectional view, taken substantially in the plane of the line 5—5 in Figure 2, and;

Figure 6 is a cross sectional view, taken substantially in the plane of the line 6—6 in Figure 3.

Like characters of reference are employed to designate like parts in the specification and throughout the several views.

Referring now to the accompanying drawings in detail, the general reference character 10 designates a disk plow including a suitable frame 12 which carries an obliquely extending row of disks 14, in accordance with conventional practice.

A pair of front traveling wheels 16 are provided in a staggered relation at the forward end portion of the frame 12, each of these wheels being mounted upon a stub shaft 18 provided on a radius arm 20 which, in turn, is equipped with a forked portion pivoted as at 22 to the framework 12, as will be clearly apparent.

In effect, the pivots 22 assume the form of shafts rotatably journaled in tubular sockets 24 secured to the framework of the implement, this being best illustrated in the accompanying Figure 3. In any event, by virtue of the radius arms 20, the wheels 16 are rendered retractable, raising and lowering thereof being effected by means of substantially upright, longitudinally adjustable depth setting members 26, hereinafter more fully described, but in the meantime, it may be stated that each of these members includes a socket 28 formed integrally with a projection 30 whereby it is pivoted as at 32 to the associated radius arm 20, while a screw threaded shaft 34 engages the socket 26 and carries a yoke 36 formed with rows of apertures 38.

A pair of cranks 40, provided with apertures 42, are pivotally and adjustably connected as at 44 to the yokes 36, the cranks 40 being secured to transversely extending shafts 46 rotatably mounted on the frame 12.

Additional cranks 48, 50 are also secured to the respective shafts 46, the crank 48 being operatively connected to the crank 50 by means of a coupling rod 52, while the crank 50 is pivoted as at 54 to the reciprocable piston rod of a hydraulic cylinder 56 mounted upon the frame 12.

It will be apparent from the foregoing that by virtue of this arrangement, raising and lowering of the wheels 16 may be effected by simply actuating the piston rod of the cylinder 56 in one direction or the other, the cylinder 56 being of the "double acting" type, and receiving its hydraulic pressure through the medium of flexible lines 58 from a tractor 60 by which the implement 10 is drawn.

The implement 10 is connected to the tractor 60 by means of a suitable hitch 62, and the lines 58 are separably connected to a suitable hydraulic valve 64, whereby the operation of the cylinder 56 may be conveniently controlled while the operator of the tractor remains in his seat.

Means are provided for pre-setting or pre-adjusting the "depth" of the disks 14 with respect to the wheels 16, so as to govern the depth to which the disks are embedded in the ground when the wheels 16 are upraised, these means including the aforementioned members 26, as will be clearly apparent. The sockets 26 are provided with housings 66 in which are positioned gears 68 formed with screw-threaded bores operatively engaging the shafts 34. Accordingly, by rotating the gears 68, the sockets 28 are caused to travel downwardly or upwardly on the shafts 34 and the overall length of the members 26 is increased or decreased as desired, thereby lowering or raising the wheels 16 with respect to the disks 14, notwithstanding the absence of actuation of the cylinder 56.

Rotation of each gear 68 is effected by means of a further gear 69 provided in the housing 66, the gear 69, in turn, being operatively connected through the medium of a suitable universal joint 70 to a rotatable control rod 72.

Forward end portions of the two control rods 72 are journaled in suitable supports 74, 76 provided above the hitch 62, the mounting of the supports being hereinafter more fully described. However, it is to be noted that the rods 72 terminate at their forward ends in crank handles 78, so that by simply rotating these handles, the position of the two wheels 16 with respect to the frame 12 may be independently and individually pre-adjusted.

The implement 10 is also equipped with a rear traveling wheel 80 rotatably mounted in a slanting position upon a stub shaft 82 which, in turn, is provided at the lower end of a substantially upright shaft 84 rotatably journaled in the frame 12, the upper end of the shaft 84 carrying a lever 86 which is operatively connected by means of a bar 88 to a further lever 90. The latter is secured to a substantially upright shaft 92 journaled on the forward end portion of the frame 12 and provided adjacent its lower end with a crank 94.

A housing 96, configurated substantially as shown, is pivotally connected as at 98 to a bracket 100 which, in turn, is adjustably secured to a carrier bar 102 provided on the tractor 60 at one side of the hitch 62, the housing 96 being disposed above the level of the hitch 62 and including a tubular guide 104, as is best shown in Figure 5.

The guide 104 slidably accommodates the forward end portion of an internally screw threaded tube 106, the rear end portion of which is, in turn, pivotally connected as at 108 to the aforementioned crank 94.

A screw threaded rod 110 operatively engages the internally threaded bore of the tube 106 and extends at its forward end into the housing 96, being mounted against axial movement in any suitable manner and operatively connected by means of suitable gearing 112 and by a suitable universal joint 114 to a rotatable control handle 116 mounted in a suitable support 118 carried by the housing and tubular guide members 96, 104 respectively.

As the implement is drawn behind the tractor and the latter is steered to one side or the other, the lateral disposition of the carrier bar 102 with respect to the hitch 62 will exert a pulling or a pushing force (as the case may be) on the steering members 96, 110, 106 which, through the medium of the connecting members 94, 92, 88 and 86 will steer the wheel 80 accordingly. The ratio of deflection of the wheel 80 with respect to the turning movement of the tractor may be adjusted by the variable connection of the bracket 100 to the bar 102, as facilitated by a row of apertures 120 with which the bar is formed (see Figure 2). That is to say, the ratio of deflection of the wheel 80 may be increased or decreased by increasing or decreasing the lateral distance between the bracket 100 and the hitch 62.

Moreover, the wheel 80 may be preadjusted to a deflected position by rotating the handle 116, so as to increase or decrease the overall length of the steering members 96, 110, 106, this preadjustment, of course, being independent of the deflection of the wheel 80 by steering the tractor, as above described.

It is to be noted that the aforementioned support 76 for the crank handles 78 is carried by the hitch 62 as is best shown in Figure 1, and attention is also directed to the fact that the handles 78 as well as the handle 116 are conveniently accessible to the operator of the tractor 60.

Finally, attention is directed to the adjustment of the pivot 44 in the apertures 38, 42, of the members 36, 40 respectively, this adjustment being of what may be referred to as an intermediate nature, being intended primarily for pre-setting of the wheels 16 with respect to the disks 14 in instances where the extent of adjustment facilitated by the members 26 is insufficient.

It is believed that the advantages and use of the invention will be clearly apparent from the foregoing disclosure and, accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In an agricultural implement including a frame, a long and short arm pivotally suspended from one of their ends from opposite sides of the frame, wheels journaled on said arms at the free ends thereof, rocker means on said frame connected to the free ends of said arms for simultaneously raising and lowering said arms to evenly raise and lower said wheels, and adjustable members interconnecting said arms and said rocker means for raising and lowering said arms independently of said rocker means, said rocker means including rock shafts on said frame and rocker arms on said shafts, each of said adjustable members including an upstanding projection having a smooth bore socket in the upper end thereof, a rocker arm attaching member having its lower end threaded and received in said socket, and gear means on said projection threadedly receiving said lower end of said attaching member, said gear means being rotatably and non-slidably fixed to said projection.

2. In an agricultural implement including a frame, a long and a short arm pivotally suspended from one of their ends from opposite sides of the frame, wheels journaled on said arms at the free ends thereof, rocker means on said frame connected to the free ends of said arms for simultaneously raising and lowering said arms to evenly raise and lower said wheels, and adjustable members interconnecting said arms and said rocker means for raising and lowering said arms independently of said rocker means, each of said adjustable members including an upstanding projection pivotally attached at its lower end to the free end of one of said arms, an elongated socket formed in the upper end of said projection, and a rotatable gear on said projection above said socket, said gear and said socket having aligned bores, screw means threadedly received in the gear bore and slidably disposed in the socket bore, means operatively connected with said gear for rotating the same and axially sliding said screw means within the socket bore, said screw means being connected to said rocker means.

3. In an agricultural implement including a frame, a long and a short arm pivotally suspended from one of their ends from opposite sides of the frame, wheels journaled on said arms at the free ends thereof, rocker means on said frame connected to the free ends of said arms for simultaneously raising and lowering said arms to evenly raise and lower said wheels, and adjustable members interconnecting said arms and said rocker means for raising and lowering said arms independently of said rocker means, said rocker means including a pair of rock shafts journaled transversely on said frame and being longitudinally offset from one another, rocker arms on said shafts connected to said adjustable members and means for rocking said rock shafts.

References Cited in the file of this patent

UNITED STATES PATENTS

| Number | Name | Date |
|---|---|---|
| 666,949 | Winkler | Jan. 29, 1901 |
| 1,547,778 | Barker | July 28, 1925 |
| 1,702,615 | Paul | Feb. 19, 1929 |
| 1,846,489 | Johnson | Feb. 23, 1932 |
| 2,225,253 | Beyer | Dec. 17, 1940 |
| 2,290,245 | Mott | July 21, 1942 |
| 2,330,304 | Mott | Sept. 28, 1943 |
| 2,342,306 | Silver | Feb. 22, 1944 |
| 2,410,918 | Acton | Nov. 12, 1946 |
| 2,555,554 | Miller | June 5, 1951 |